US009357165B2

(12) United States Patent
Lu et al.

(10) Patent No.: US 9,357,165 B2
(45) Date of Patent: May 31, 2016

(54) METHOD AND APPARATUS FOR PROVIDING VIDEO CONFERENCING

(71) Applicant: AT&T Intellectual Property I, LP, Atlanta, GA (US)

(72) Inventors: Min Lu, Holmdel, NJ (US); Yi Chin, Freehold, NJ (US); Gerald L. Hoover, Red Bank, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 478 days.

(21) Appl. No.: 13/679,514

(22) Filed: Nov. 16, 2012

(65) Prior Publication Data

US 2014/0139609 A1  May 22, 2014

(51) Int. Cl.
*H04N 7/14* (2006.01)
*H04N 7/15* (2006.01)

(52) U.S. Cl.
CPC .................................. *H04N 7/15* (2013.01)

(58) Field of Classification Search
CPC ................... H04M 2203/25–2203/258; H04M 2203/50–2203/509; H04M 2203/65–2203/658
USPC .................... 348/14.01–14.16; 370/259–271, 370/351–357; 379/67.1–88.28, 201.01, 379/202.01–207.01; 709/201–207, 709/217–248
See application file for complete search history.

(56) References Cited

U.S. PATENT DOCUMENTS

| | | | |
|---|---|---|---|
| 6,454,415 B1 * | 9/2002 | Vlahos ............................ 353/30 |
| 7,227,567 B1 * | 6/2007 | Beck et al. ................. 348/14.07 |
| 7,564,476 B1 * | 7/2009 | Coughlan et al. .......... 348/14.08 |
| 7,679,638 B2 * | 3/2010 | Eshkoli et al. ............. 348/14.08 |
| 8,294,823 B2 * | 10/2012 | Ciudad et al. ................. 348/586 |
| 8,629,894 B2 * | 1/2014 | Lee .............................. 348/14.02 |
| 2002/0132610 A1 * | 9/2002 | Chaplin et al. ................ 455/414 |
| 2008/0028092 A1 * | 1/2008 | Shen ............................. 709/231 |
| 2008/0077953 A1 * | 3/2008 | Fernandez ............... H04N 7/18 725/32 |
| 2008/0234007 A1 * | 9/2008 | Lee ............................... 455/566 |
| 2009/0086013 A1 | 4/2009 | Thapa |
| 2009/0168984 A1 * | 7/2009 | Kreiner et al. ........... 379/202.01 |
| 2011/0153738 A1 | 6/2011 | Bedingfield |
| 2011/0300806 A1 * | 12/2011 | Lindahl et al. .............. 455/63.1 |
| 2012/0050323 A1 * | 3/2012 | Baron et al. .................. 345/632 |
| 2012/0069131 A1 | 3/2012 | Abelow |
| 2012/0147121 A1 * | 6/2012 | Erb et al. ................... 348/14.01 |
| 2012/0287222 A1 | 11/2012 | Liu et al. |

\* cited by examiner

*Primary Examiner* — Hemant Patel
(74) *Attorney, Agent, or Firm* — Guntin & Gust, PLC; Robert Gingher

(57) ABSTRACT

A system that incorporates teachings of the subject disclosure may include, for example, capturing images that are associated with a video conference communication session, obtaining a video conference policy associated with the video conference communication session, applying object pattern recognition to the images to detect an object in the images, and retrieve first replacement image content according to the video conference policy. The images can be adjusted by replacing a first portion of the images other than the detected object with the first replacement image content to generate first adjusted video content. The first adjusted video content can be provided to the first recipient communication device via the video conference communication session. Non-adjusted video content can be provided according to the video conference policy to the second recipient communication device via the video conference communication session. Other embodiments are disclosed.

20 Claims, 7 Drawing Sheets

METHOD AND APPARATUS FOR PROVIDING VIDEO CONFERENCING

FIELD OF THE DISCLOSURE

The subject disclosure relates to a method and apparatus for providing video conferencing.

BACKGROUND

Video technology is widely used on various devices, including mobile phones, tablets and personal computers. The video technology is allowing for a variety of services to be provided to users, including broadcast services, video-on-demand services, and video conferencing.

However, with this wide-spread use of video technology comes concern about privacy. For example, employees are adopting telecommuting or home office arrangements with their employers. Privacy of their personal life can be a growing concern for these employees. When a user engages in a video conference/video call, the user may be worried about a loss of privacy. Privacy concerns can stem from the contents of the background or other portions of the image, the person's image itself, or both.

BRIEF DESCRIPTION OF THE DRAWINGS

Reference will now be made to the accompanying drawings, which are not necessarily drawn to scale, and wherein.

DETAILED DESCRIPTION

Figure 1A:
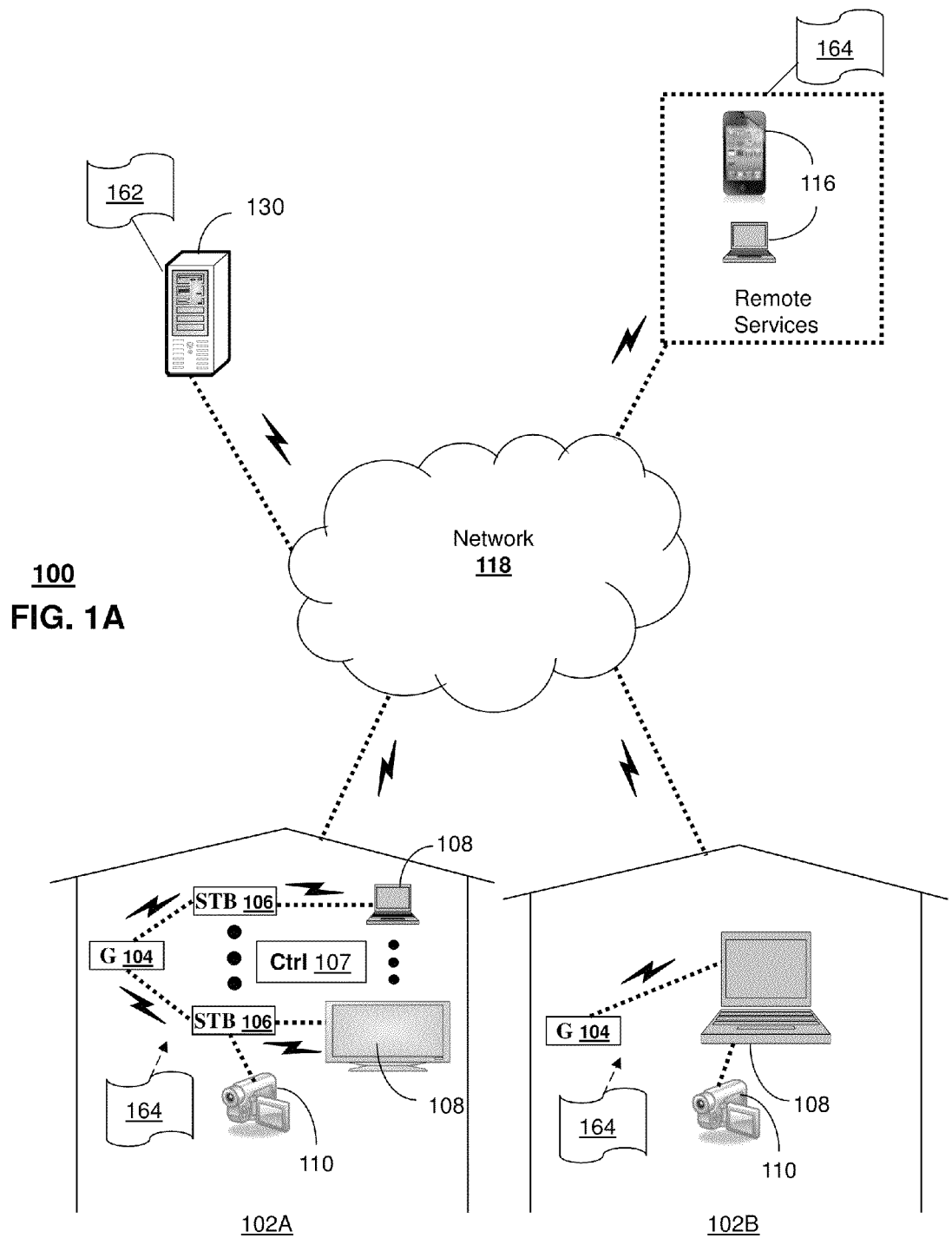
FIGS. 1A and 1B depict illustrative embodiments of communication systems that provide video conferencing.

The subject disclosure describes, among other things, illustrative embodiments for providing video conferencing services in which conference content can be adjusted. The adjustments to content can be to video content and/or audio content. In one or more embodiments, captured images can be adjusted to replace image portions (e.g., detected objects) while retaining other image portions (e.g., a user's face, a whiteboard with information to be discussed during the video conference, and so forth). In one or more embodiments, replacement image portions can be still images and/or moving images. In one or more embodiments, multiple versions of adjusted content (e.g., depicting different replacement content) can be generated so that different recipient devices receive the different versions of the adjusted content. In one or more embodiments, a source device's location can be monitored and the content being transmitted to one or more recipient devices can be changed based on a location change of the source device, such as changing between adjusted and non-adjusted content or changing between two different versions of the adjusted content. In one or more embodiments, adjusting content can be performed in the context of the adjustment occurring using processing as a service in the network, under the decision of/control of the originating user of that content subject to policy, content adjustment using processing in the UE, and/or under the decision of/control of the receiving user of that content subject to policy.

One embodiment of the subject disclosure includes a server having a memory and a processor. The memory stores computer instructions and the processor is coupled to the memory. The processor, responsive to executing the computer instructions, performs operations including receiving images captured by a source communication device associated with a video conference communication session established among video conference participant devices including the source communication device, a first recipient communication device, a second recipient communication device and a third recipient communication device. The controller can obtain a video conference policy associated with the video conference communication session and can apply facial pattern recognition to the images to detect a facial object in the images. The controller can retrieve first replacement image content according to the video conference policy and can adjust the images by replacing a portion of the images other than the facial object with the first replacement image content to generate first adjusted video content. The controller can provide the first adjusted video content to the first recipient communication device via the video conference communication session. The controller can retrieve second replacement image content according to the video conference policy. The controller can adjust the images by replacing the portion of the images other than the facial object with the second replacement image content to generate second adjusted video content and can provide the second adjusted video content to the second recipient communication device via the video conference communication session. The controller can provide non-adjusted video content including the images according to the video conference policy to the third recipient communication device via the video conference communication session. The first adjusted video content is provided to the first recipient communication device without providing the non-adjusted video content to the first recipient communication device. The second adjusted video content is provided to the second recipient communication device without providing the non-adjusted video content to the second recipient communication device.

One embodiment of the subject disclosure is a method including receiving, by a system including a processor, images captured by a mobile communication device associated with a video conference communication session established among video conference participant devices including the mobile communication device and a recipient communication device. The method can include obtaining, by the system, a video conference policy associated with the video conference communication session. The method can include applying, by the system, facial pattern recognition to the images to detect a facial object in the images. The method can include obtaining, by the system, first location data associated with the mobile communication device. The method can include retrieving, by the system, first replacement image content according to the video conference policy and the first location data. The method can include adjusting, by the system, the images by replacing a portion of the images other than the facial object with the first replacement image content to generate first adjusted video content. The method can include providing the first adjusted video content to the recipient communication device via the video conference communication session. The method can include obtaining, by the system, second location data associated with the mobile communication device. The method can include detecting a change in location of the mobile communication device that satisfies a location change threshold based on a comparison of the first and second location data. The method can include retrieving, by the system and responsive to the change in location, second replacement image content according to the video conference policy and the second location data. The method can include adjusting, by the system and responsive to the change in location, the images by replacing the portion of the images other than the facial object with the second replacement image content to generate second adjusted video content. The method can include providing, by the system and responsive to the change in location, the second adjusted video content to the recipient communication device via the video conference communication session in place of the first adjusted video content.

One embodiment of the subject disclosure includes a tangible computer-readable storage device comprising computer instructions, which, responsive to being executed by a processor of a source communication device, cause the processor to perform operations including capturing images via a camera coupled with the source communication device, where the images are associated with a video conference communication session established among video conference participant devices including the source communication device, a first recipient communication device and a second recipient communication device. The computer instructions enable obtaining a video conference policy associated with the video conference communication session. The computer instructions enable applying facial pattern recognition to the images to detect a facial object in the images. The computer instructions enable retrieving first replacement image content according to the video conference policy. The computer instructions enable adjusting the images by replacing a first portion of the images other than the facial object with the first replacement image content to generate first adjusted video content, where the adjusting of the images to generate the first adjusted video content includes retaining a second portion of the images other than the facial object in the first adjusted video content. The computer instructions enable providing the first adjusted video content to the first recipient communication device via the video conference communication session. The computer instructions enable providing non-adjusted video content including the images according to the video conference policy to the second recipient communication device via the video conference communication session, where the first adjusted video content is provided to the first recipient communication device without providing the non-adjusted video content to the first recipient communication device.

FIG. 1A depicts an illustrative embodiment of a communication system 100 for providing video conferencing services in which video and/or audio content can be selectively adjusted. In one or more embodiments, the adjustment of the video and/or audio content can be performed in real-time or near real-time so that users of the recipient communication devices do not experience a noticeable and undesired lag.

The communication system 100 can represent various types of media systems or portions thereof, including interactive television (e.g., an Internet Protocol Television (IPTV) media system), telephone and/or data services systems. Packets associated with media content, data content, voice content and so forth can be received from and/or delivered to various devices, including end-user devices, over a network 118. For instance in an IPTV environment, the packets can be delivered utilizing a multicast communication protocol. However, system 100 can utilize various communication protocols to route traffic and otherwise manage information being transmitted between devices, including broadcast and unicast techniques.

System 100 can distribute video conference content (e.g., video and/or audio) via the network 118 to commercial and/or residential premises or buildings 102 (two of which are shown—102A and 102B). For example, premises 102A and/or 102B can house a gateway 104 (such as a residential or commercial gateway). The network 118 can include various network elements that enable communications of the conference content (e.g., video and/or audio content) between one or more source devices and one or more recipient devices, such as in a video conference communication session having multiple participant devices. The network 118 can represent a group of digital subscriber line access multiplexers (DSLAMs) located in a central office or a service area interface that provide broadband services over fiber optical links and/or copper twisted pairs to buildings 102A and 102B. Wireless communications can also be utilized in the delivery of the services, with or without the use of hardwire links. The gateway 104 can use communication technology to distribute signals to media processors 106 such as Set-Top Boxes (STBs) which in turn present conference content (as well as other communication services including broadcast channels) to media devices 108 such as computers or television sets managed in some instances by a media controller 107 (such as an infrared or RF remote controller).

In one or more embodiments, a recording device 110 (e.g., a digital video camera) can be utilized for capturing images and/or audio for use in the video conference in a non-adjusted version and/or in one or more adjusted versions. The recording device 110 can be a separate device and/or can be integrated into one or more other devices, such as integrated into the media processors 106, the media devices 108 and/or the mobile communication devices 116. The gateway 104, the media processors 106, the media devices 108 and/or the recording device 110 can utilize tethered communication technologies (such as coaxial, powerline or phone line wiring) and/or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services. Modulated signals can be transferred to the media processors 106 for demodulating, decoding, encoding, and/or distributing broadcast channels to the media devices 108. The media processors 106 can be equipped with a broadband port to an Internet Service Provider (ISP) network to enable interactive services such as VoD and EPG as described above.

The subject disclosure can apply to other over-the-air and/or landline media content services system. Multiple forms of media services can be offered to media devices over landline technologies such as those described above. Additionally, media services can be offered to media devices by way of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other wide area wireless access network technologies can be used in one or more embodiments of the subject disclosure.

Some of the network elements of the IPTV media system can be coupled to one or more computing devices 130, a portion of which can operate as a web server for providing web portal services over the network 118 to wireline media devices 108 or wireless communication devices 116. System 100 can also provide for all or a portion of the computing devices 130 to function as a content adjustment system (herein referred to as server 130). Server 130 is illustrated as a single server, however, the server 130 can be a group of servers in various configurations, including a master-slave arrangement and/or a distributed environment where functions are shared or isolated amongst the servers. The server 130 can use computing and communication technology to perform function 162, which can include among other things, adjusting video and/or audio content based on replacement content. For example, the server 130 can receive images from a source device, such as media processor 106, media device 108 and/or mobile device 116, and can adjust those images based on one or more conference policies. The conference policies can control the adjustment of the images and can be generated in various ways including by individuals, by service providers, and/or by entities (e.g., employers).

Figure 1B:
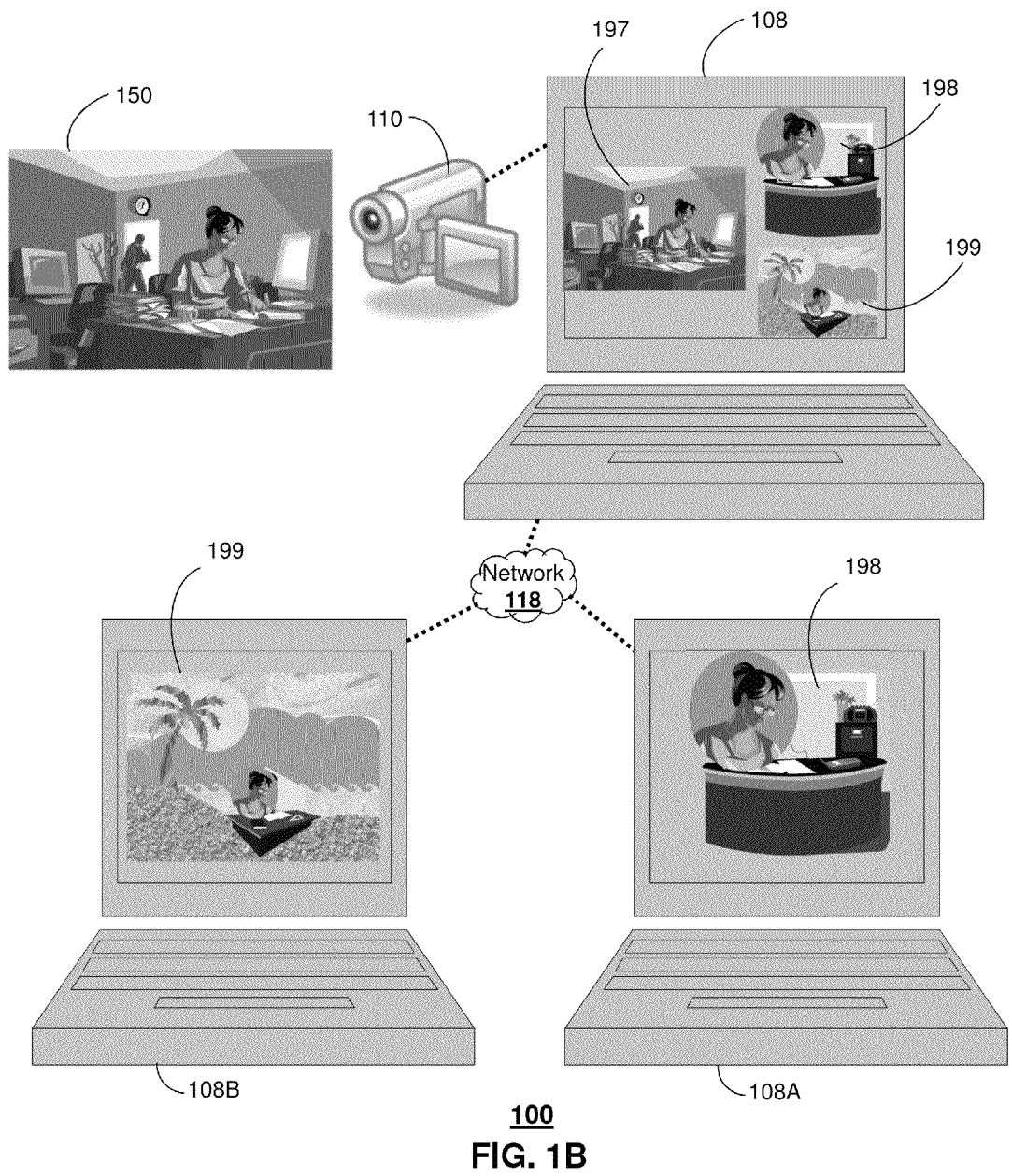

As an example and referring additionally to FIG. 1B, recording device 110 of computer 108 can capture content (e.g., video and/or audio content) at an environment 150, such as in an office where multiple workers and desks are present. A conference policy, such as associated with the computer 108 and/or associated with the user of the computer 108, can dictate or otherwise instruct that facial pattern recognition is to be applied to the images captured by the recording device 108 to detect a facial object (e.g., the face and upper torso of the user) in the images. The conference policy can further provide that a first adjusted content 198 is to be delivered to a first recipient communication device (e.g., computer 108A) and a second adjusted content 199 is to be delivered to a second recipient communication device (e.g., computer 108B), where the conference participant devices include computers 108, 108A and 108B.

Continuing with this example, the conference policy (or other factors including user preference inputs) can further provide for a selection of the replacement content that is to be utilized in the first and second adjusted content 198, 199. In this example, the first replacement content for first adjusted content 198 is an office setting having a clean desk without any co-workers present while the second replacement content for second adjusted content 199 is an ocean with a beach. The first and second adjusted content 198, 199 can utilize a superposition or combination of the facial object with the replacement content, which is delivered to the computers 108A and 108B, respectively. In one embodiment, the first and second adjusted content 198, 199 can be presented at the display of the source device (computer 108) so that the user can see the adjusted video content that is being delivered to the recipient devices. In one embodiment, the non-adjusted content 197 can be presented at the source device display. In another embodiment, a graphical user interface can be presented that enables the user of the source device to switch between delivering any one of the non-adjusted, first and second content to any one of the recipient devices (e.g., computers 108A and 108B).

The exemplary embodiment of FIG. 1B describes computer 108 as being the source device while computers 108A and 108B are the recipient devices. However, it should be understood that any one or more of the computers 108, 108A and 108B can function as either or both of the source and recipient devices, and the adjustment of content can be performed for all or only some of the source devices, such as computers 108 and 108B capturing images that are adjusted and delivered to the other conference participants while computer 108B receives adjusted content from computers 108 and 108A but provides non-adjusted content to computers 108 and 108A. This exemplary embodiment also depicts three computers 108, 108A and 108B as being the conference participants, however, the conference participants can be any number of devices, as well as any type of communication device (e.g., media processors 106, media devices 108 and/or mobile devices 116).

This exemplary embodiment also illustrates adjustment of images, however, the adjusted content can include adjusted audio content. For example, noise filtering can be performed so that background noise in the video conference is reduced. In one embodiment, the adjustment of the audio content can include adding desired background sounds, such as the sounds of the waves for second adjusted content 199.

The exemplary embodiment of FIG. 1B illustrates the distribution of the adjusted content in a video conference session. The processing of the images and/or audio to generate the adjusted content can be performed by various devices, such as locally by the source device (e.g., computer 108), centrally by a remote server (e.g., server 130 of FIG. 1A), and/or a combination of devices, such as in a distributed process where certain functions are performed by designated devices.

The media processors 106, the media devices 108 and/or the wireless communication devices 116 can be loaded with software function 164 to utilize the services of server 130. Software function 164 can include enabling interfacing with server 130 for transmitting and/or receiving adjusted conference content. In one or more embodiments, the function 164 can include performing one or more of the content adjustment functions described above or described later with respect to method 200. For example, the software function 164 can enable performing facial pattern recognition on the images captured at the source device so that only the facial object needs to be transmitted from the source device. In one embodiment, the source device, via software function 164, can detect the facial object and can generate the adjusted content, such as by superimposing the facial object into replacement content (e.g., replacement content selected from among a group of replacement content based on user input and/or based on conference policies).

Figure 2:
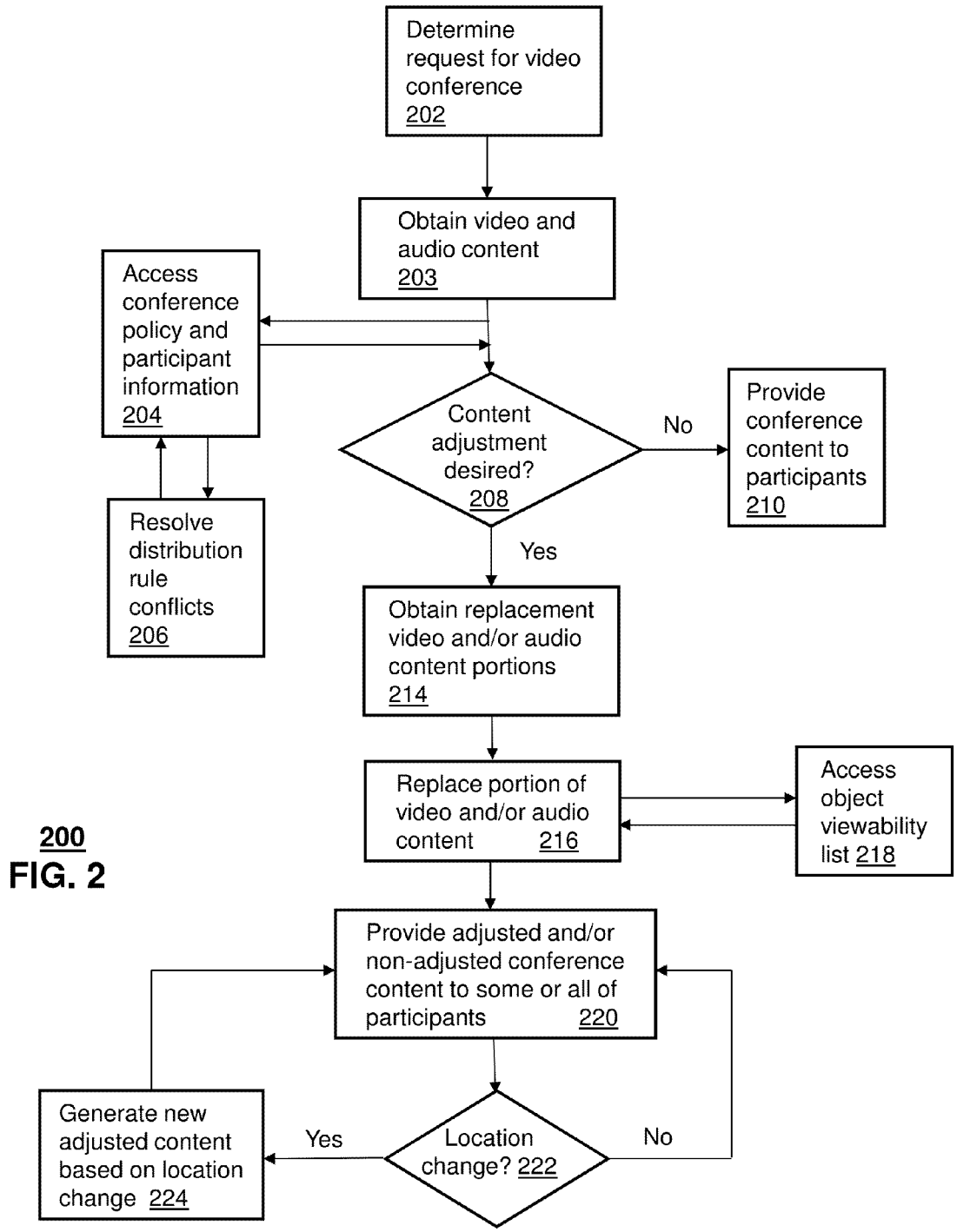
FIG. 2 depicts an illustrative embodiment of a method for delivering video conferencing services.

FIG. 2 depicts an illustrative method 200 that operates in portions of the devices of FIGS. 1A and 1B and/or the devices or systems described with respect to other exemplary embodiments herein. Method 200 can begin at 202 in which one or more users seek to establish a video conference and a request for the conference is identified, detected or otherwise determined. The detection of the request can be by a remote device, such as the server 130, and/or can be by a device participating in the capturing of content for the video conference, such as a communication device that generates a session establishment message (e.g., an INVITE message) for the video conference. The video conference can be based on a video conference communication session that utilizes various communication protocols and occurs over various networks, such as an IP network, an IPTV network, an IMS network, and so forth. Participants of the video conference can be identified, such as using device information submitted with a conference request, including accessing a subscriber database or other user information sources to identify the user device and/or users associated with the device. In one or more embodiments, user profiles associated with communication devices can be accessed to obtain information associated with the users and/or information associated with the video conference communication session.

At 203, video content and/or audio content from one or more participant devices can be retrieved or otherwise obtained. The content can be from a single participant device of the video conference or can be from multiple participant devices (e.g., all or some of the participant devices). The particular number of participant devices that provide the content depends on whether a single device will be distributing adjusted images and/or audio or whether multiple devices will be distributing adjusted images and/or audio. As an example, first, second and third communication devices may participate in a video conference where the first device provides non-adjusted images to the second and third devices, where the second device provides adjusted images to the first and third devices, and where the third device provides adjusted images to the first device and non-adjusted images to the second device. The providing of non-adjusted images as compared with providing adjusted images can be based on many criteria and factors including device capabilities, user preferences, and so forth. In one embodiment, the video and/or audio content can be obtained locally by the source communication device(s) that is coupled to, or otherwise in communication with, video and/or audio capturing components, where the local device(s) will be performing the image adjustment. In another embodiment, the server 130 can obtain the video and/or audio content for processing. In one embodiment, the source device capturing the video content can apply facial pattern recognition to the captured video content so that only images of the user's face are provided for further processing, such as to the server 130. In another embodiment, the source device can provide the entire captured video content to the server 130 for further processing so that resources of the source device (e.g., a mobile device) are not utilized for pattern recognition.

At 204, one or more video conference policies associated with the video conference communication session can be accessed. For example, the policy can be associated with or otherwise correspond to the user that is requesting the conference. In another embodiment, multiple policies can be accessed that correspond to each of the participants of the video conference. The policies can correspond to the users of the devices and/or can correspond to the device that is participating in the video conference. The policies can be general policies, such as generated by a service provider and agreed to as part of a subscriber agreement, and/or can be individual policies, such as generated by subscribers that are enabled with video conferencing services.

In one embodiment, general policies can be based on service level agreements which allow different video conference distribution rules depending on the level of service of the subscriber. For example, a higher level service agreement (which may be at a different cost from a lower level service agreement) can enable establishing video sub-conferences with multiple participants and adjusting the video content differently for some of those multiple participants, while the lower level service agreement may limit the video conference distribution policy to a single adjusted version along with the non-adjusted version of the video content for distribution to the conference participants. The sub-conferencing can be performed in other manners, such as limiting distribution of selected video and/or selected audio to certain recipients.

In one embodiment, individual policies can be based on user preferences and/or other information associated with the user. For example, a user may indicate in a stored user preference that images captured from a home office and intended for distribution to co-workers or to other entities associated with the user's employer are to be adjusted in a first manner (e.g., moving images presenting an office background) while those same images intended for another entity (e.g., family or friends) are to be adjusted in a second manner (e.g., moving images presenting a home background). The individual policies can also be generated based on user historical data. For example, the user's utilization of video conferencing can be monitored to determine whether the user typically modifies video conferencing images based on participants, locations, subject matter, and so forth. This information can be stored and evaluated to determine whether an individual policy should be generated (e.g., a default to modifying images when the participant is a competitor entity involved in a joint project). In one embodiment, historical data from other types of communications can be monitored and utilized for generating the individual policies. For example, a user's encryption of particular documents when emailing them can be monitored and an individual policy generated based on modifying images responsive to a determination that the video conferencing is related to the encrypted documents.

In one or more embodiments, the policies can be entity-based or otherwise generated by an entity associated with one or more of the participants of the video conference. For example, the entity can be an employer that establishes a policy indicating that all video conferences captured from a particular location are subject to image modification, such as at a research facility where confidentiality is very important. The criteria in the entity policy for subjecting images to a modification requirement can vary and can include location, employee status or position, subject of video conference, and so forth. For instance, an entity policy may indicate that engineers in the research and development division of the entity have an image modification requirement imposed upon their video conferencing due to their position as engineers while salespersons do not have the requirement imposed upon them.

The policies can be stored at various locations, including locally at the participants' communication devices and/or centrally, such as at the server 130 and/or a database accessible by the server 130. As an example, where the server 130 is receiving the images and modifying the images according to the video conference policies then the server can retrieve the policies from the participant devices and/or from a memory (e.g., a subscriber database). However, as described herein, the particular device performing the image adjustments can vary and thus the device gathering or otherwise accessing the one or more video conference policies can vary.

In one embodiment at 206, multiple video conference policies (e.g., associated with one or more of the participants, associated with an entity, associated with a service provider, and so forth) can be accessed and analyzed to determine video content distribution rules. The analysis can be performed in various ways including parsing of the policies. In some instances, the rules may present a conflict, such as a first policy that indicates a participant is to receive non-modified images in the video content and a second policy that indicates that all participants are to receive modified images. Conflict resolution can be employed to determine the distribution rules (e.g., determining which participants receive adjusted and/or non-adjusted images). For instance, priority rules can be applied to the conflicting rules to determine which of the video conference policy rules should control. The priority rules can be based on various factors, including the identity of the participants, the source of the images, and so forth. As an example, the priority rules can provide for a conflict override for the source of the captured images. In this example, a first policy of a first recipient device to obtain non-modified images would be overridden by a second policy of the source device to modify images captured by the source device. In another embodiment, the conflict resolution can be based on the participants' status or position with the entity, such as the director of engineering's policy to modify captured images can override an engineer's policy or an outside vendor's policy to obtain non-modified images during the video conference. These are a few examples of conflicts and resolutions to those conflicts that can occur in the exemplary embodiments and other types of conflicts and resolution are also contemplated. In one embodiment, the conflict resolution can be performed by the device that is modifying the images, such as the server 130 or the source device capturing the images.

At 208, it can be determined whether content adjustment is desired or required under the circumstances based on a number of factors including one or more of the conference policies. Other factors can include device capabilities, network traffic, quality of service constraints, bandwidth limitations, and so forth. If no adjustment of images and/or audio is to be performed then non-adjusted video content (including images captured by the source device (as well as the other source devices)) and/or non-adjusted content can be exchanged with one or more recipient devices at 210. If on the other hand it is determined that content adjustment is desired or required then at 214 replacement content can be obtained. The replacement content can be for one or both of the images and audio captured by one or more of the source devices. The replacement content can be selected based on the video conference policies, distribution rules, and/or conflict resolution as described with respect to steps 204-206. The replacement content can be selected using other techniques in combination with or in place of the video conference policies, distribution rules, and/or conflict resolution, including based on user preferences obtained at the time of the video conference, such as via a GUI presented during the conference connection process. In one embodiment, the replacement content can be selected based on other data collected with respect to the participant device(s), such as location data, device capability data, network capability data, and/or network status data.

The replacement content can be in various formats including one or more of still images, moving images, blank screens, and text screens. The replacement content can be content stored locally at the source device and/or stored remotely, such as a mailbox (associated with the source device) accessible by a remote server (e.g., server 130). In one embodiment, the replacement content can be content that is generated by or in conjunction with the source device (e.g., mobile device 116, media device 108 and/or media processor 106). For instance, a user can upload background still images or moving images that the user desires to have displayed as the replacement content during the video conference. In one embodiment, the replacement content can be selected from among a group of replacement content. For example, a user can utilize a GUI presented at a source device to select the subject matter of vacation images and can select from among still or moving images (e.g., previewed in the GUI) that depict various vacation locations.

The replacement content can also include audio signals that are utilized in adjusting the audio content, such as to hide undesired noise, inject desired music into a conference, and so forth. In one embodiment, a voice sample(s) can be obtained associated with the conference participant(s) so that the voice sample can be utilized in a comparison with the audio content to detect background noise or sounds other than participant voices. For example, the server 130 can obtain audio content captured by the mobile communication device 116 during the video conference communication session and can apply audio recognition analysis on the audio content to detect noise in the audio content utilizing an audio sample of the user of the mobile communication device. In another example, other data associated with the source device, such as a present location, can be utilized in the determination of the replacement content. For example, the server 130 can detect from location data of the media device 108 that the media device is capturing video and audio content in an office building. Based on this location, the server 130 can suggest replacement audio content that includes a softer music to be played as background in the video conference. The server 130 can also utilize the location data for estimating types of noises present in the audio content, such as determining from the location data that a mobile device 116 is capturing audio and video content from a stadium and estimating that the background noise is a crowd at the stadium cheering.

In one embodiment, replacement audio content can be selected from among a group of replacement audio content, such as based on user input, user preferences (e.g., stored in a user profile and/or included in an individual conference policy associated with the user), a subject matter of the video conference (e.g., audio content suggestions can be presented to the user for selection based on a determined theme of the video conference), and so forth.

At 216, the conference content can be adjusted based on the selected replacement content. The adjustment of the conference content can be performed in various ways. In one embodiment, facial pattern recognition can be applied to the images to retain the face of the user in the images while replacing a remaining portion of the images with the replacement content. For instance, the face of the user can be superimposed or otherwise combined with replacement content depicting the user in an office setting, conference room setting or other desired background setting. In another embodiment, object pattern recognition can be applied to the images to determine one or more other portions of the image that should be retained and combined with the replacement content (along with the user's face). The exemplary embodiments are not intended to be limited to only combining the user's face with the replacement content, and can include other portions of the user, such as retaining the face and upper torso of the user or the entire body of the user in the images. The exemplary embodiments can detect a facial object which can be the face of the user and may or may not include other portions of the user as described above.

The exemplary embodiments can also include objects other than the user that are to be retained in the images. For instance, the object pattern recognition can identify a whiteboard that is to be used in the video conference or a prototype that is the subject of discussion in the video conference while replacing other portions of the images with the replacement content. The replacing of all or some of the background can be done to depict an actual setting such as a conference room or can be done to depict an unrealistic setting such as the user and the user's desk sitting on the beach. As described above, the replacement content can be selected at step 214 for many purposes, such as masking the use of a home office or a mobile phone so that one or more of the other conference participants views the user in an office or conference room setting.

The replacement of the content can also include adjusting of the audio content to reduce noise and/or provide desired background sounds for the video conference. In one embodiment, audio pattern recognition can be used to detect and/or isolate noise for the purpose of reducing the noise. The audio pattern recognition can be performed based on numerous techniques. In one embodiment, audio samples can be used in the audio pattern recognition, including voice samples, noise samples, and so forth. For instance, one or more of the conference participants can provide voice samples (e.g., during the video conference and/or prior to the video conference) that can be used for identifying participant voices during the video conference so that other sounds can be isolated for noise reduction. In another embodiment, the audio samples can be noise samples, such as dog barking, traffic, crowd cheering and so forth, which can be used to directly identify the undesired noise. The audio content can then be adjusted to reduce the identified undesired noise such as through noise cancellation, noise extraction and so forth.

The exemplary embodiment can also perform adjustment of the audio content to add desired audio, such as background sounds or music. For instance, a video conference to sell vacations at a beach resort can add beach sounds, such as waves, as background audio for the video conference. In another embodiment, the replacement audio content can be particular sounds that are being discussed with respect to the video conference. For instance, a video conference regarding operation of an engine may include audio content that is adjusted by enabling one or more of the users to selectively add the sound of the engine in the background, where audio recordings of the engine where captured and stored at a previous time.

In one embodiment at 218, the method 200 can utilize a list(s) (e.g., compilation(s)) identifying objects that are to be retained in the images and/or are to be removed from the images to generate the adjusted video content. For instance, the list can identify a whiteboard as an object that is to be retained in the images so as to enable the user to write on the whiteboard during the video conference. In this example, the list can also identify a user's desk as an object that is to be replaced so that a messy desk appears to be a clean desk. The list can identify only objects to be retained, only objects to be replaced, or both. The list can be stored at various locations (including copies at multiple locations) such as the source device, the server 130, a mailbox storage device accessible to one or both of the source device and the server 130, and so forth. The list can be generated by various sources based on various information. For example, one or more of the conference participants can generate individual lists (e.g., based on user inputs including a selection of objects from among a group of objects to be retained and/or replaced) that identify objects to be retained and/or replaced. In one embodiment, the list can be generated by an entity (e.g., an employer of one or more of the conference participants) that desires to restrict exchange of certain information (e.g., replacing prototypes in the images) or to set a desired environment as a background (e.g., replace all home office environments with a conference room environment).

In one embodiment, the object list (or suggested objects to be placed on the list subject to approval by the user) can be generated automatically. For example, user communications can be monitored to identify objects to be placed on the list. For instance, emails having a subject heading corresponding to the subject matter of a video conference (e.g., the subject matter can be identified in an invite message for the video conference) can be analyzed (e.g., via parsing and language engines) to determine objects that are to be discussed during the video conference and/or other objects that are not to be discussed. Based on the analysis, the list can be populated (or suggestions provided for populating the list) with the determined objects. The generation and use of the object list can be implemented according to the techniques described above with respect to the conference policies, including conflict resolution between multiple lists (such as using priority rules), generating and utilizing general, entity and/or individual lists, and so forth.

At 220, the adjusted and/or non-adjusted content can be provided to the conference participants. As explained above, the adjusted content can include any number of adjusted video contents and/or any number of adjusted audio content. For instance, a first recipient communication device can receive a first adjusted video and/or audio content while a second recipient communication can receive a second adjusted video and/or audio content. In this example, non-adjusted video and/or audio content may or may not be provided to one or more other recipient devices. The providing of different versions of the content (e.g., adjusted and non-adjusted video and/or audio content) can be based on setting up one or more sub-conferences from the video conference. For example, the video conference can be established among a source device and first, second, third and fourth recipient devices. The source device can establish a first sub-conference with the third recipient device and a second sub-conference with the fourth recipient device. In this example, the first and second recipient devices can receive a first adjusted content while the third recipient device receives a second adjusted content. The fourth recipient device can receive the non-adjusted content. The particular configuration for which devices receive which content can vary and can be controlled based on numerous factors, such as based on the conference policies as described at step 204. The use of sub-conferences can also include providing separate messaging channels (e.g., instant text messages) where access is limited to conference participants that are members of the sub-conference. It should be understood that the source device in the exemplary embodiments can be any one or more of the participant devices and the exemplary embodiments contemplate multiple source devices for a video conference. The exemplary embodiments can also include the providing of the adjusted and/or non-adjusted video content being changed during the video conference. For example, a recipient device that is receiving adjusted video content may be switched to receiving non-adjusted video content so that the recipient device receives images including a replaced object(s) (e.g., a prototype being discussed during the video conference).

In one embodiment at 222, a determination can be made as to whether the source device has changed location. The determination can be made based on satisfying a threshold location change, such as a location change of a certain distance or a location change into a different room in a building. If there is no location change then the adjusted and/or non-adjusted content can continue to be provided to the conference participants. If on the other hand a location change is determined then at 224 a new adjusted (or non-adjusted) content can be generated and provided in place of a previous adjusted (or non-adjusted) content. For example, the source device can be a mobile device that is capturing images for a video conference in a restricted lab of an entity. Based on this location and a conference policy (e.g., an entity conference policy where the user is an employee of the entity) that restricts images of the lab being exchanged, first adjusted content for the source device can be a facial object (e.g., a face and upper body) of the user superimposed or otherwise combined with a background of a conference room (e.g., still or moving images). Once a location change is detected, such as from a comparison of first and second location data for the mobile device, indicating that the user has moved outside of the restricted lab (e.g., back to his or her desk) then the first adjusted content can be replaced with non-adjusted content or second adjusted content (e.g., images that retain the user's desk but replace objects on the object list such as replacing a whiteboard near the user's desk containing confidential information with a blank whiteboard). In this example, the location data can be received from various sources, including the mobile device, GPS server(s) and so forth. Method 200 can monitor for location changes and can implement a change to the content being forwarded based on the monitored location of the source device.

Method 200 can be performed by one or more devices (e.g., in a centralized process or a distributed process) including one or more of the server 130 and the conference participant devices (e.g., media processor 106, media device 108 and/or mobile device 116). In one embodiment, processing of the content (e.g., images and/or audio signals) to generate adjusted content can be performed by each of the source devices for content captured by that source device without using a centralized server, such as server 130. In another embodiment, the steps of method 200 can be distributed amongst various devices. For instance, the server 130 can perform facial pattern recognition on images received from one or more of the source devices and the recipient devices can adjust the video content by superimposing or otherwise combining the facial object from the facial pattern recognition with replacement content, such as a selected background.

In one or more of the exemplary embodiments, the replacement content can be selected by the recipient device(s) (e.g., based on user input preference, conference policies and so forth). For instance, a recipient device can receive a facial object that is generated based on images captured by a source device. The source device can have applied a conference policy to replace the background of the images. However, in this example, the selection of the replacement background can be made by the recipient device.

In one embodiment, the selection of the replacement content can be made in conjunction with an identified subject matter of the video conference. For example, the server 130 can determine from an analysis of emails or other communications of a user that the user is engaging in a video conference to sell vacation property (e.g., beachfront property). The server 130 can provide suggestions for (or automatically implement) adjustment of the video content captured by the user's device so that the user appears to be working from the beach, such as positioning the user's desk on the beach. In this example, the replacement content can be moving images of the actual beachfront property (e.g., captured previously and stored by the user's device) or can be generic beach moving images. In this example, the replacement content can also be still images of the actual beachfront property or other similar property.

Figure 3:
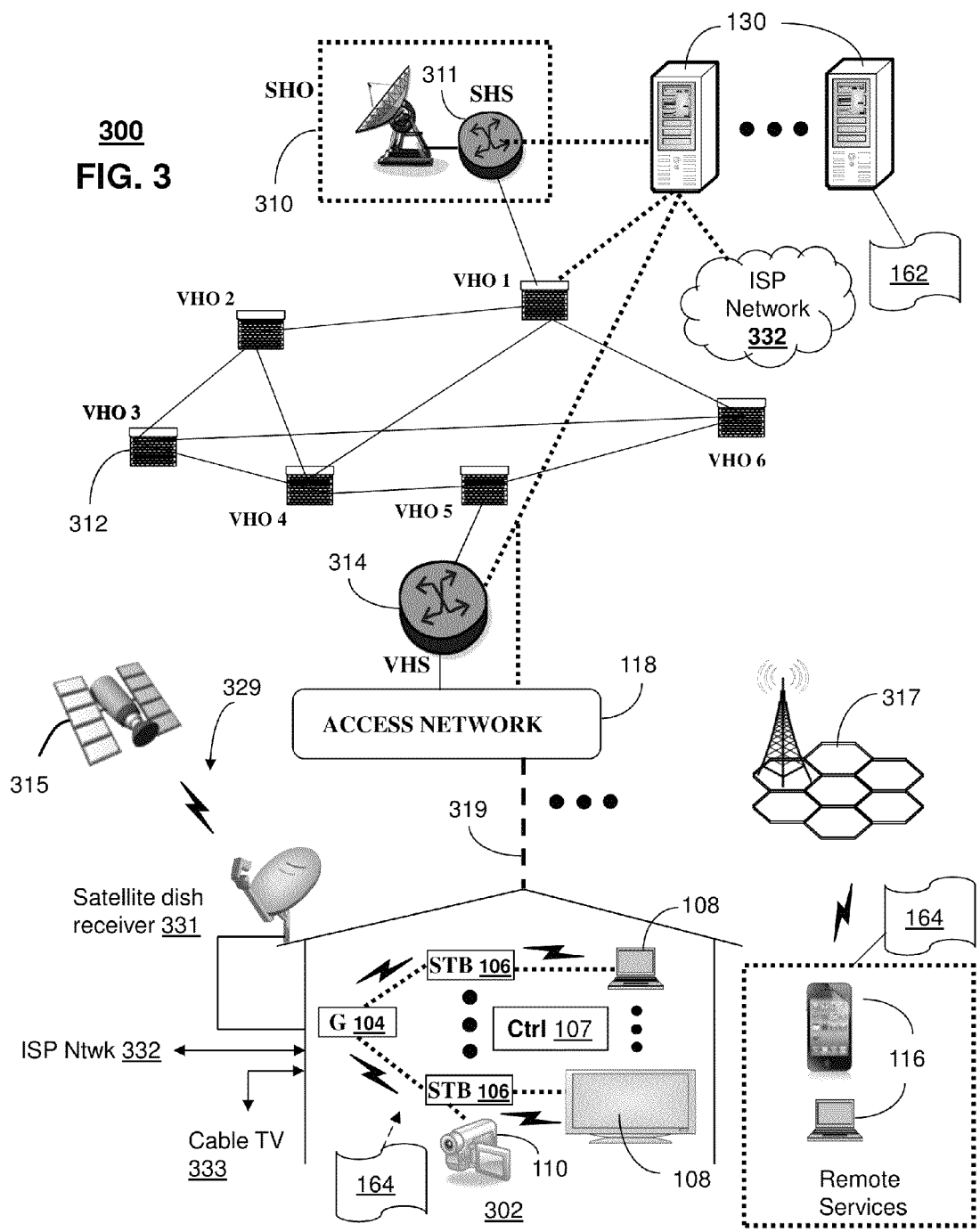
FIGS. 3-4 depict illustrative embodiments of communication systems that provide media services including video conferencing.

FIG. 3 depicts an illustrative embodiment of a communication system 300 for delivering video conferencing services and for delivering media content including television programming and advertisements. System 300 can enable one or more conference participants to adjust content that is being delivered during a video conference. The adjustments can be to video and/or audio content. The adjustments can be made pursuant to various criteria and factors, including conference policies generated by one or more of conference participant(s), a service provider, an entity associated with the video conference and so forth. In one embodiment, multiple versions of the adjusted content can be generated, such as based on selections of various still and/or moving image backgrounds (e.g., selections made by a user of the source device or made by an entity associated with the video conference). The adjustment of the content can include extracting a facial object from images and combining the facial object into replacement content, such as combining the facial object (which was captured at a home office) with a work office. The adjustment of the content is not limited to retaining the facial object, and can include retaining other objects from the images, such as a whiteboard or a prototype shown in the images.

The communication system 300 can represent an Internet Protocol Television (IPTV) media system. The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol.

The VHS 314 can distribute multimedia broadcast content via the access network 118 to the commercial and/or residential buildings 102 housing the gateway 104 (such as a residential or commercial gateway). The access network 118 can represent a group of digital subscriber line access multiplexers (DSLAMs) located in a central office or a service area interface that provide broadband services over fiber optical links or copper twisted pairs 319 to buildings 102. The gateway 104 can use communication technology to distribute broadcast signals to the media processors 106 such as Set-Top Boxes (STBs) which in turn present broadcast channels to the media devices 108 such as computers or television sets managed in some instances by the media controller 107 (such as an infrared or RF remote controller).

The gateway 104, the media processors 106, the media devices 108 and/or the recording devices 110 can utilize tethered communication technologies (such as coaxial, powerline or phone line wiring) and/or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 102. Modulated signals received by the satellite dish receiver 331 can be transferred to the media processors 106 for demodulating, decoding, encoding, and/or distributing broadcast channels to the media devices 108. The media processors 106 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. The subject disclosure can apply to other present or next generation over-the-air and/or landline media content services system.

Some of the network elements of the IPTV media system can be coupled to the computing devices 130, a portion of which can operate as a web server for providing web portal services over the ISP network 332 to wireline media devices 108 or wireless communication devices 116. As described with respect to FIG. 1A, server(s) 130 can perform a number of functions 162 including determining replacement content and/or adjusting content utilizing the replacement content as well as portions of images that have been retained (e.g., a facial object). The media processors 106, media devices 108 and/or wireless communication devices 116 can be provisioned with software function 164 to utilize the services of server 130. Software function 164 can include enabling interfacing with server 130 for receiving targeted advertising. In one or more embodiments, the function 164 can include providing video conference services that enables adjusting of the delivered video and/or audio content.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other wide area wireless access network technologies can be used in one or more embodiments of the subject disclosure.

Figure 4:
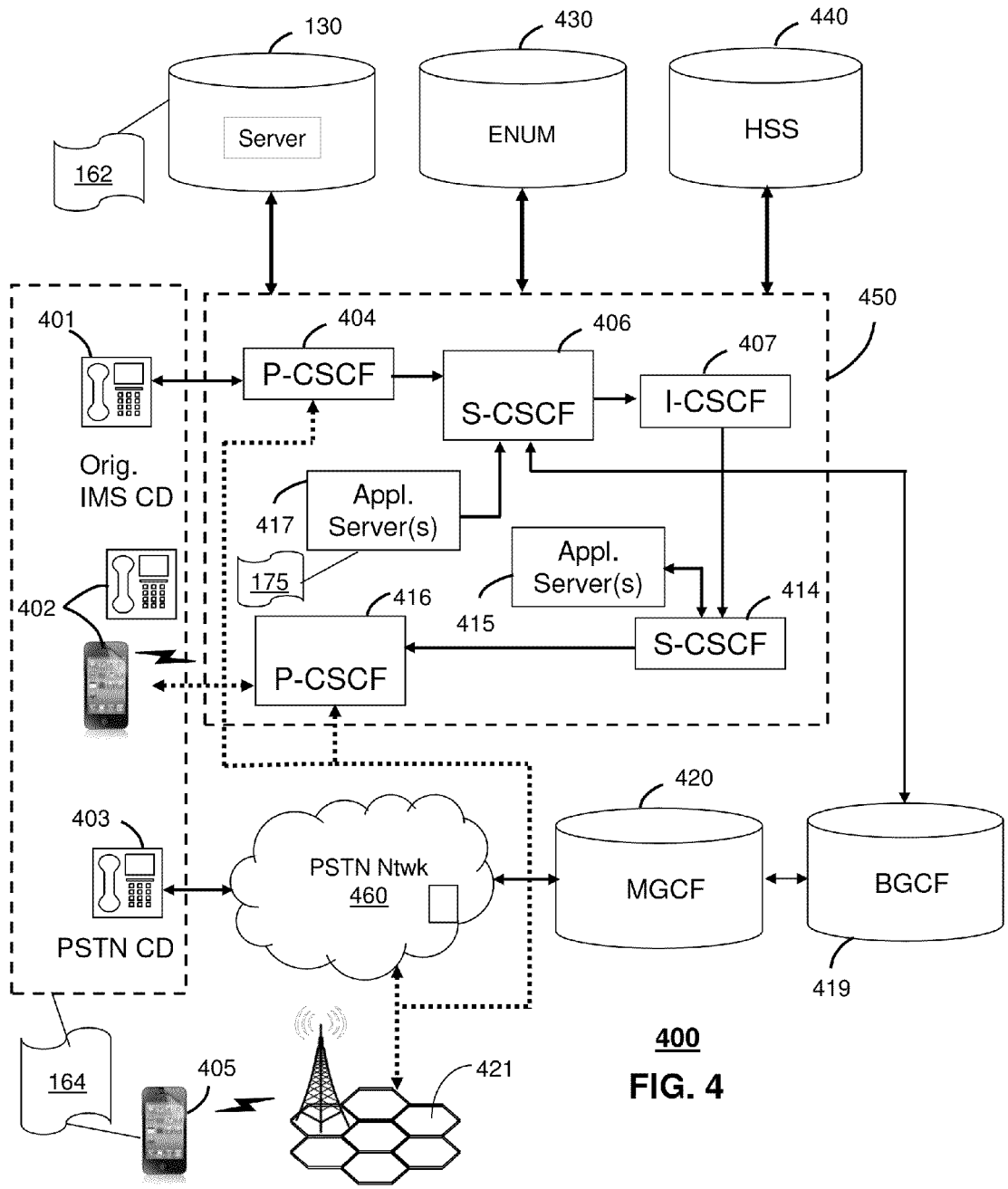

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with communication systems 100 and 300 as another representative embodiment of communication systems 100 and 300. System 400 can include server 130 for adjusting conference content, including adjusting video and/or audio content based on replacement content.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) or user equipment (UE) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF, which may be an originating P-CSCF.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 130 of FIG. 3 can be operably coupled to the second communication system 400 for purposes similar to those described above. Server 130 can perform function 162 and thereby provide video conferencing services to the CDs 401, 402, 403 and 405 of FIG. 4. CDs 401, 402, 403 and 405, which can be adapted with software to perform function 164 to utilize the services of the server 130. Server 130 can be an integral part of the application server(s) 417 performing function 175, which can be similar to function 162 (e.g., adjusting images by superimposing facial objects and/or other identified objects into replacement content) and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
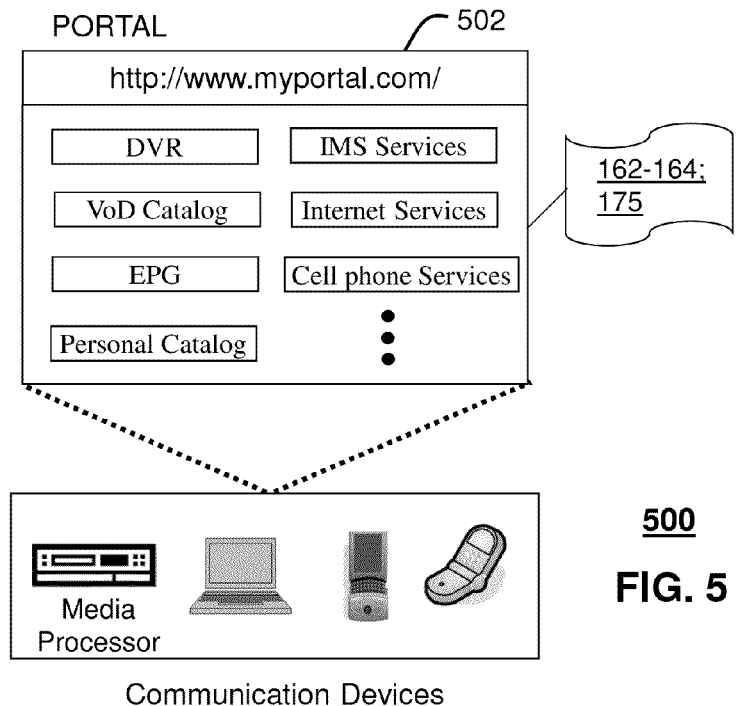
FIG. 5 depicts an illustrative embodiment of a web portal for interacting with the communication systems of FIGS. 1 and 3-4.

FIG. 5 depicts an illustrative embodiment of a web portal 502 which can be hosted by server applications operating from the computing devices 130 of the communication system 300 illustrated in FIG. 3. The web portal 502 can be used for managing services of communication systems 100 and 300-400. A web page of the web portal 502 can be accessed by a Uniform Resource Locator (URL) with an Internet browser such as Microsoft's Internet Explorer™, Mozilla's Firefox™ Apple's Safari™, or Google's Chrome™ using an Internet-capable communication device such as those described in FIGS. 1 and 3-4. The web portal 502 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 502 can also be used for provisioning IMS services described earlier, provisioning Internet services, provisioning cellular phone services, and so on.

Web portal 502 can also be used by users to provide information to the server 130 regarding the adjustments to the conference content. For example, audio samples, such as a voice sample, can be provided via the web portal 502 so that a device (e.g., server 130) performing noise reduction via audio content adjustment can access the voice sample which assists in isolating the noise from the voice. In one or more embodiments, web portal 502 can be utilized by users to provide preferences for the individual conference policies. For instance, users can generate a list of objects that are to be replaced and/or retained in the images during the generation of adjusted video content. As another example, the user can select replacement content (e.g., still and/or moving images) from among a group of replacement content and/or can identify the circumstances for utilizing the selected replacement content, such as identifying recipient devices or locations that trigger use of the replacement content. In one embodiment, the web portal 502 can be utilized for making adjustments to facial features of a facial object (e.g., a user's face and upper torso) identified via facial pattern recognition, such as enabling adjusting of the facial object to depict combed hair.

Figure 6:
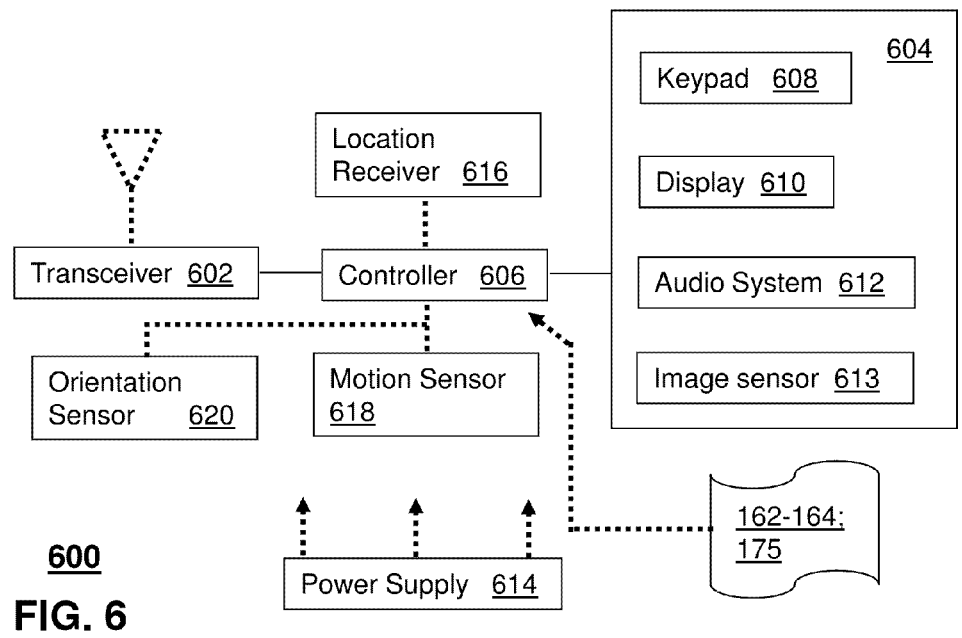
FIG. 6 depicts an illustrative embodiment of a communication device utilized in the communication systems of FIGS. 1 and 3-4.

FIG. 6 depicts an illustrative embodiment of a communication device 600. Communication device 600 can serve in whole or in part as an illustrative embodiment of the devices depicted in FIGS. 1 and 3-5. The communication device 600 can present video and/or audio content that has been adjusted based on replacement content. In one or more embodiments, the communication device 600 can perform facial and/or object pattern recognition that enables facial objects or other objects to be superimposed or combined with the replacement content. In one or more embodiments, the communication device can present a graphical user interface that enables a user to make selections of replacement content from among a group of replacement content and/or designate the criteria for utilizing the replacement content, such as based on a recipient device identification, a subject matter of a video conference, a user location, and so forth.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 110 can be an integral part of the housing assembly of the communication device 100 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. As describe above, this location data can be utilized in determining whether a location change for the device has occurred (such as via a comparison of location data that indicates a difference which satisfies a location change threshold), which would trigger a change in the delivery of the conference content (such as switching between versions of the adjusted content or switching between adjusted and non-adjusted content). The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 100.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 100 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media processor 106, the media devices 108, or the portable communication devices 116 of FIGS. 1 and 3, as well as the IMS CDs 401-402 and PSTN CDs 403-405 of FIG. 4. It will be appreciated that the communication device 600 can also represent other devices that can operate in the communication systems of FIGS. 1 and 3-4 such as a gaming console and a media player.

The communication device 600 shown in FIG. 6 or portions thereof can serve as a representation of one or more of the devices of communication systems 100 and 300-400. In addition, the controller 606 can be adapted in various embodiments to perform the functions 162-164 and 175, respectively, to facilitate the adjustment of conference content (e.g., adjusting video and/or audio content) during the video conference.

Upon reviewing the aforementioned embodiments, it would be evident to an artisan with ordinary skill in the art that said embodiments can be modified, reduced, or enhanced without departing from the scope of the claims described below. For example, to facilitate the delivery of the adjusted conference content in real-time or near real-time in one embodiment, multiple devices can perform multiple steps of method 200, such as video content alteration being performed by a first server 130 and audio content alteration being performed by a second server 130. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
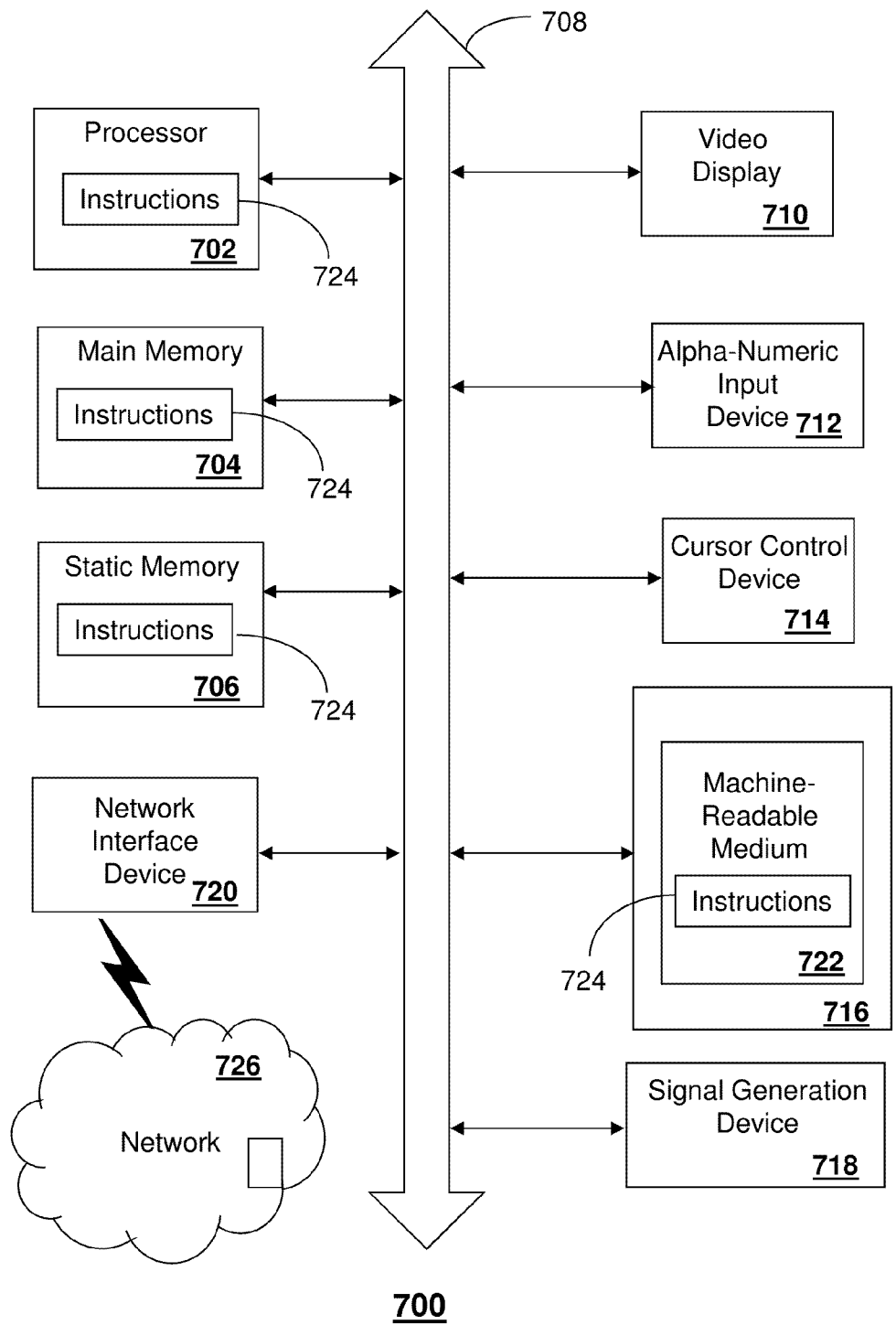
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods describe above. One or more instances of the machine can operate, for example, as the server 130, media processor 106, media device 108, mobile device 116 and other devices of FIGS. 1-6. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments (including combining selected features or removing selected features), and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
    a memory to store computer instructions; and
    a processor coupled to the memory, wherein the processor, responsive to executing the computer instructions, performs operations comprising:
        receiving images captured by a source communication device associated with a video conference communication session established among video conference participant devices comprising the source communication device, a first recipient communication device, a second recipient communication device and a third recipient communication device;
        obtaining a video conference policy associated with the video conference communication session, wherein the video conference policy comprises a first presentation policy to be applied to the first recipient communication device, a second presentation policy to be applied to the second recipient communication device, and a third presentation policy to be applied to the third recipient communication device, and wherein the first presentation policy, the second presentation policy, and the third presentation policy differ from each other;
        analyzing subject matter of the video conference communication session to determine a list of objects to be removed from the images;
        applying object pattern recognition to the images to detect a listed object;
        applying facial pattern recognition to the images to detect a facial object in the images;
        retrieving first replacement image content according to the video conference policy, wherein the first replacement image content is provided by a first user of the source communication device or by a second user of the first recipient communication device;
        based on the first presentation policy associated with the first recipient device, adjusting the images by replacing a portion of the images other than the facial object with the first replacement image content to generate first adjusted video content, wherein the portion of the images comprises the detected listed object and wherein the first replacement image content comprises a replacement object for the detected listed object;
        providing the first adjusted video content to the first recipient communication device via the video conference communication session;
        retrieving second replacement image content according to the video conference policy;
        based on the second presentation policy associated with the second recipient device, adjusting the images by replacing the portion of the images other than the facial object with the second replacement image content to generate second adjusted video content;
        providing the second adjusted video content to the second recipient communication device via the video conference communication session; and
        based on the third presentation policy associated with the third recipient device, providing non-adjusted video content including the images according to the video conference policy to the third recipient communication device via the video conference communication session, wherein the first adjusted video content is provided to the first recipient communication device without providing the non-adjusted video content to the first recipient communication device, and wherein the second adjusted video content is provided to the second recipient communication device without providing the non-adjusted video content to the second recipient communication device.

2. The server of claim 1, wherein the operations further comprise providing the first and second adjusted video content to the source communication device for presentation at the source communication device in separate graphical user interface windows.

3. The server of claim 1, wherein the list further comprises a list of private objects determined according to the video conference policy, and wherein the operations further comprise:
    applying object pattern recognition to the images to detect a private object from among the list of private objects, wherein the replacing of the portion of the images to generate the first adjusted video content includes replacing the private object in the images with a replacement object from the first replacement image content.

4. The server of claim 1, wherein the source communication device is a mobile communication device, and wherein the operations further comprise:
    obtaining location data associated with the mobile communication device; and
    detecting a change in location of the mobile communication device during the video conference session,
    wherein the providing of the first adjusted video content to the first recipient communication device via the video conference communication session comprises switching from providing the non-adjusted video content to the providing of the first adjusted video content responsive to the detecting of the change in location of the mobile communication device.

5. The server of claim 1, wherein the first replacement image content comprises a still image, and wherein the adjusting the images to generate the first adjusted video content comprises superimposing the facial object on the still image, and wherein sub-conferencing is performed among a subset of the video conference participant devices to limit distribution of target content among the subset.

6. The server of claim 1, wherein the adjusting the images to generate the first adjusted video content includes retaining another portion of the images other than the facial object in the first adjusted video content, and wherein the first replacement image content comprises moving image content.

7. The server of claim 1, wherein the operations further comprise:
    adjusting facial features of the facial object in the first adjusted video content according to user preferences in the video conference policy.

8. The server of claim 1, wherein the operations further comprise:
    obtaining identification information associated with the source communication device;

determining an identity of a source device user of the source communication device; and accessing the video conference policy based on the identity of the source device user.

9. The server of claim 1, wherein the video conference policy is a group of video conference policies associated with each of the first, second and third recipient communication devices and with a source device user of the source communication device, and wherein the operations further comprise:

determining video content distribution rules according to the group of video conference policies;

detecting a rules conflict in the video content distribution rules; and resolving the rules conflict according to a priority rule associated with the source device user to generate an adjusted video content distribution rules, wherein the providing of the first and second adjusted video content and the non-adjusted video content is according to the adjusted video content distribution rules.

10. The server of claim 1, wherein the operations further comprise:

obtaining audio content captured by the source communication device during the video conference communication session;

applying audio recognition analysis on the audio content to detect noise in the audio content;

adjusting the audio content to generate adjusted audio content that reduces the noise; and providing the adjusted audio content to the first recipient communication device without providing the audio content to the first recipient communication device.

11. The server of claim 10, wherein the operations further comprise accessing a voice sample for a source device user of the source communication device, wherein the noise is detected utilizing the voice sample.

12. The server of claim 11, wherein the processor, responsive to executing the computer instructions, performs operations comprising:

receiving user preference information from the source communication device, wherein the user preference information is based on user preferences selected at the source communication device via user input at the source communication device, wherein the first replacement image content is selected from among a group of replacement image content according to the user preference information.

13. A method comprising:

receiving, by a system including a processor, images captured by a mobile communication device associated with a video conference communication session established among video conference participant devices comprising the mobile communication device and a recipient communication device;

obtaining, by the system, a video conference policy associated with the video conference communication session, wherein the video conference policy comprises a presentation policy to be applied to the recipient communication device;

analyzing, by the system, subject matter of the video conference communication session to determine a list of objects to be removed from the images;

applying, by the system, object pattern recognition to the images to detect a listed object;

applying, by the system, facial pattern recognition to the images to detect a facial object in the images;

obtaining, by the system, first location data associated with the mobile communication device;

retrieving, by the system, first replacement image content according to the video conference policy and the first location data, wherein the first replacement image content is provided by a first user of the mobile communication device or by a second user of the recipient communication device;

based on the presentation policy associated with the recipient device, adjusting, by the system, the images by replacing a portion of the images other than the facial object with the first replacement image content to generate first adjusted video content, wherein the portion of the images comprises the detected listed object and wherein the first replacement image content comprises a replacement object for the detected listed object;

providing the first adjusted video content to the recipient communication device via the video conference communication session;

obtaining, by the system, second location data associated with the mobile communication device;

detecting a change in location of the mobile communication device that satisfies a location change threshold based on a comparison of the first and second location data;

retrieving, by the system and responsive to the change in location, second replacement image content according to the video conference policy and the second location data, wherein the second replacement image content is provided by the first user of the mobile communication device or by the second user of the recipient communication device;

based on the presentation policy associated with the recipient device, adjusting, by the system and responsive to the change in location, the images by replacing the portion of the images other than the facial object with the second replacement image content to generate second adjusted video content; and providing, by the system and responsive to the change in location, the second adjusted video content to the recipient communication device via the video conference communication session in place of the first adjusted video content.

14. The method of claim 13, wherein the video conference participant devices include an additional recipient communication device, and further comprising:

providing, by the system, non-adjusted video content including the images according to the video conference policy to the additional recipient communication device via the video conference communication session, wherein the first and second adjusted video content is provided to the recipient communication device via the video conference communication session without providing the non-adjusted video content.

15. The method of claim 13, comprising:

receiving, by the system, user preference information from the mobile communication device, wherein the user preference information is based on user preferences selected at the mobile communication device via user input at the mobile communication device, and wherein the first replacement image content is selected from among a group of replacement image content according to the user preference information.

16. The method of claim 13, wherein the first replacement image content includes moving images, and wherein the adjusting the images to generate the first adjusted video content includes superimposing the facial object on the moving images.

17. The method of claim 13, comprising:
   obtaining audio content captured by the mobile communication device during the video conference communication session;
   applying audio recognition analysis on the audio content to detect noise in the audio content utilizing a stored audio sample;
   adjusting the audio content to generate adjusted audio content that reduces the noise; and
   providing the adjusted audio content to the recipient communication device without providing the audio content to the recipient communication device.

18. A non-transitory computer-readable storage device comprising instructions, which, responsive to being executed by a processor of a source communication device, cause the processor to perform operations comprising:
   capturing images via a camera coupled with the source communication device, wherein the images are associated with a video conference communication session established among video conference participant devices comprising the source communication device, a first recipient communication device and a second recipient communication device;
   obtaining a video conference policy associated with the video conference communication session, wherein the video conference policy comprises a first presentation policy to be applied to the first recipient communication device, and a second presentation policy to be applied to the second recipient communication device, and wherein the first presentation policy and the second presentation policy differ from each other;
   analyzing subject matter of the video conference communication session to determine a list of objects to be removed from the images;
   applying object pattern recognition to the images to detect a listed object;
   applying facial pattern recognition to the images to detect a facial object in the images;
   retrieving first replacement image content according to the video conference policy, wherein the first replacement image content is provided by a first user of the source communication device or by a second user of the first recipient communication device;
   based on the first presentation policy associated with the first recipient device, adjusting the images by replacing a first portion of the images other than the facial object with the first replacement image content to generate first adjusted video content, wherein the first portion of the images comprises the detected listed object, wherein the first replacement image content comprises a replacement object for the detected listed object, and wherein the adjusting of the images to generate the first adjusted video content includes retaining a second portion of the images other than the facial object in the first adjusted video content;
   providing the first adjusted video content to the first recipient communication device via the video conference communication session; and
   based on the second presentation policy associated with the second recipient device, providing non-adjusted video content including the images according to the video conference policy to the second recipient communication device via the video conference communication session, wherein the first adjusted video content is provided to the first recipient communication device without providing the non-adjusted video content to the first recipient communication device.

19. The non-transitory computer-readable storage device of claim 18, wherein the list of objects further comprises objects to be retained in the images, and wherein the operations further comprise:
   applying object pattern recognition to the images to detect a listed object to be retained in the images,
   wherein the retaining of the second portion of the images other than the facial object includes superimposing the object to be retained and the facial object on the first replacement image content.

20. The non-transitory computer-readable storage device of claim 18, wherein the video conference participant devices comprise an additional recipient communication device and wherein the operations further comprise:
   retrieving additional replacement image content according to the video conference policy;
   adjusting the images by replacing the portion of the images other than the facial object with the additional replacement image content to generate additional adjusted video content; and
   providing the additional adjusted video content to the additional recipient communication device via the video conference communication session.

* * * * *